US007097140B2

(12) United States Patent
Staley et al.

(10) Patent No.: US 7,097,140 B2
(45) Date of Patent: Aug. 29, 2006

(54) SYSTEM AND METHOD FOR SPACECRAFT ATTITUDE CONTROL

(75) Inventors: Douglas A. Staley, Mississauga (CA); George Tyc, Winnipeg (CA); Peter R. Frise, Windsor (CA)

(73) Assignee: Bristol Aerospace Limited, Winnipeg (CA)

( * ) Notice: Subject to any disclaimer, the term of this patent is extended or adjusted under 35 U.S.C. 154(b) by 347 days.

(21) Appl. No.: 09/905,179

(22) Filed: Jan. 23, 2001

(65) Prior Publication Data
US 2002/0040950 A1  Apr. 11, 2002

Related U.S. Application Data

(63) Continuation-in-part of application No. PCT/CA99/00678, filed on Jul. 23, 1999.

(51) Int. Cl.
*B64G 1/28* (2006.01)

(52) U.S. Cl. ..................................... 244/165
(58) Field of Classification Search ............... 244/164, 244/165, 166; 74/5.1, 5 F, 5.34; 701/13, 701/4
See application file for complete search history.

(56) References Cited

U.S. PATENT DOCUMENTS

| 4,297,904 A | * | 11/1981 | Morton ......................... 74/5 F |
| 4,528,864 A | * | 7/1985 | Craig .......................... 74/5.34 |
| 4,592,242 A | * | 6/1986 | Kempas ........................ 74/5 F |
| 4,825,713 A | * | 5/1989 | Wilkey ......................... 74/5 F |
| 5,261,631 A | * | 11/1993 | Bender et al. ............... 244/165 |
| 5,306,975 A | * | 4/1994 | Bichler ....................... 310/90.5 |
| 5,419,212 A | * | 5/1995 | Smith .......................... 74/5 F |
| 5,820,078 A | * | 10/1998 | Harrell ........................ 244/165 |
| 6,022,005 A | * | 2/2000 | Gran et al. ................... 244/134 |
| 6,131,056 A | * | 10/2000 | Bailey et al. .................. 701/13 |
| 6,260,805 B1 | * | 7/2001 | Yocum, Jr. et al. ......... 244/165 |
| 6,311,931 B1 | * | 11/2001 | Smay .......................... 244/164 |

* cited by examiner

*Primary Examiner*—Galen Barefoot
(74) *Attorney, Agent, or Firm*—Ryan W. Dupuis; Michael R. Williams; Adrian D. Battison

(57) ABSTRACT

A momentum management system for attitude control of a spacecraft includes a housing to be fixed to the spacecraft and a momentum wheel rotor in the housing for storing angular momentum. A gimbal assembly mounts the rotor in the housing. The rotor is driven by a drive with its output coupled to the rotor. A torque generation imparts torque to the rotor about axes orthogonal to the drive axis. The gimbal assembly includes a gimbal ring coupling the drive output to the rotor. The gimbal ring in turn includes flexure joints connecting the gimbal ring to the drive and the rotor. The flexure joints are configured to permit the rotor to tilt about two flexure axes orthogonal to the drive axis to incline the rotor axis through a range of angles from about 0 degrees to about 7 degrees with respect to the drive axis under the control of said torque generation device. The preferred flexure joint is formed from two resilient, crossing webs. The webs have ring ends connected to the body of the gimbal ring and mounting ends connected to either the drive or the rotor. The system includes a launch restraint system to limit movement of the rotor along the drive axis, including a stop mounted on the drive output and a cage mounted on the rotor, surrounding the stop. Under high acceleration, the cage engages the stop to support the rotor, relieving excess stress on the flexures of the gimbal suspension. The launch restraint system also includes deflection stops adjacent opposite sides of each web of each flexure for limiting deflection of the webs.

17 Claims, 9 Drawing Sheets

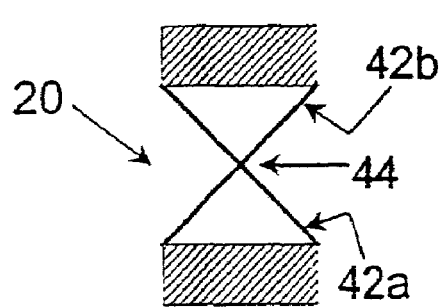
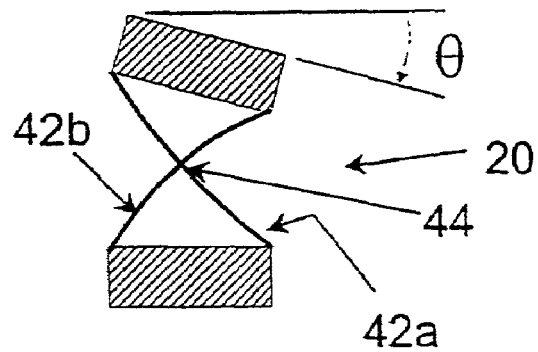
Fig. 4a    Fig. 4b
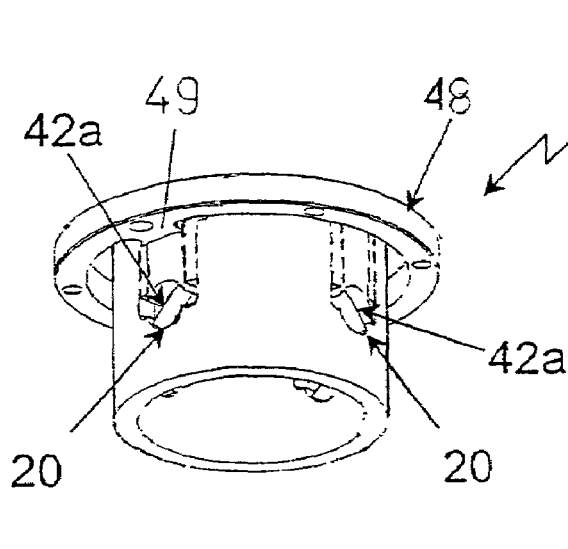
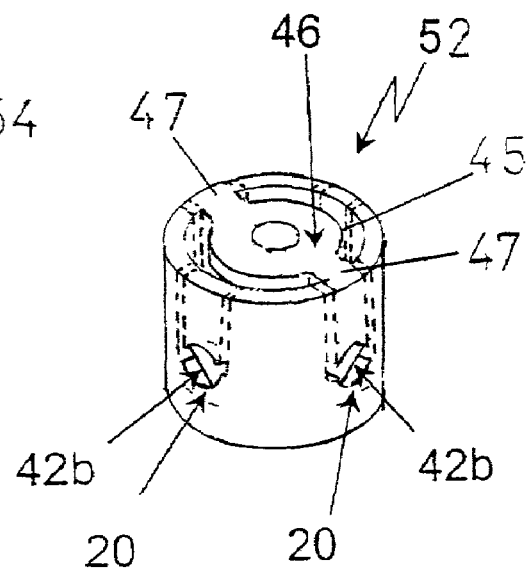
Fig. 5a    Fig. 5b

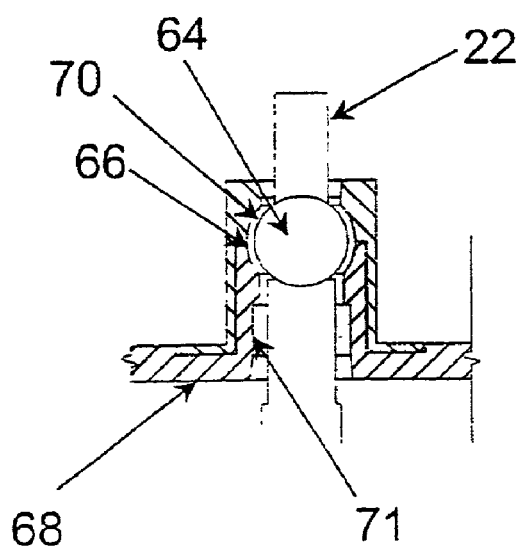 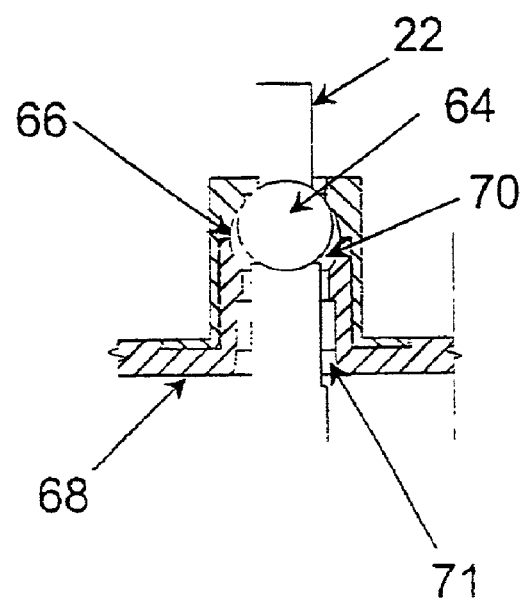
Fig. 6a    Fig. 6b
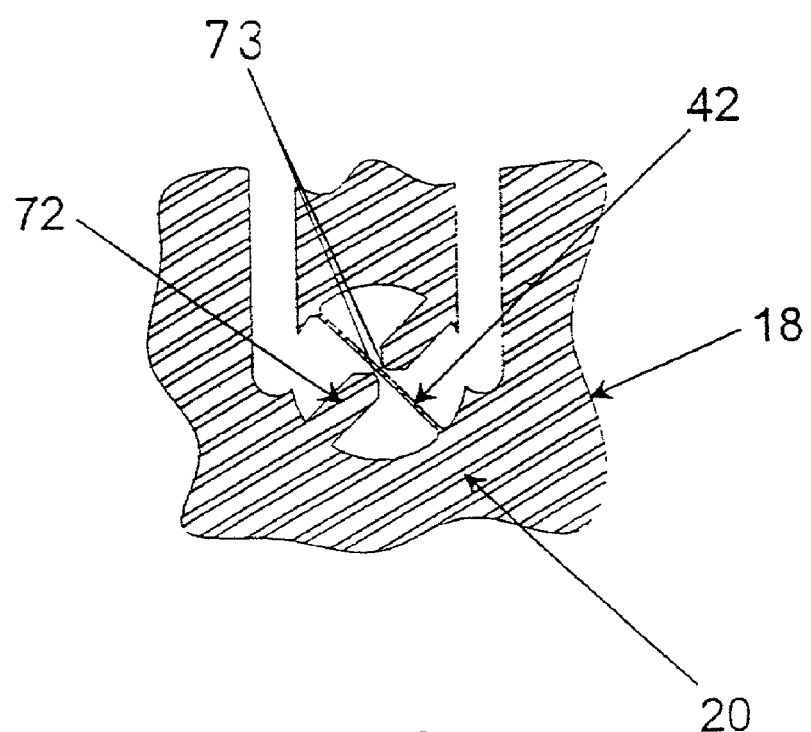
Fig. 7

SYSTEM AND METHOD FOR SPACECRAFT ATTITUDE CONTROL

CROSS REFERENCE TO RELATED APPLICATION

This application is a continuation-in-part of international application PCT/CA99/00678, filed Jul. 23, 1999.

FIELD OF THE INVENTION

The present invention relates to spacecraft attitude control systems and methods. In particular, the present invention relates to a system and method for momentum management in spacecraft attitude control.

BACKGROUND OF THE INVENTION

Spacecraft attitude control systems, such as those used to control the attitudes of satellites, are based on the direct control of angular momentum. The goal of such systems is to point a satellite, or portions of a satellite, at the earth, other celestial bodies, or another spacecraft. Attitude control may be achieved by maintaining a non-zero angular momentum state by including spinning bodies within the spacecraft. Such spacecraft are generally called body stabilized or three axis spacecraft. The present invention is intended for such three axis spacecraft, whether in geosynchronous or low earth orbit missions.

High accuracy three axis attitude control is currently based on control of stored angular momentum. For high accuracy, it is possible to use three or more reaction wheels, so that the total angular momentum magnitude and direction can be controlled, within the spacecraft body, by varying the speeds of each of the wheels. The wheels are usually mounted in an orthogonal triad. To provide redundancy, an additional wheel must be supplied for each axis, a costly and heavy approach. Control versatility can also he obtained with four wheels mounted in a skewed configuration so that any three wheels can be used for control in the event of the failure of any one wheel. A major drawback of the multi-wheel configurations is the number of wheels, with attendant redundancy, and the associated duplicated electronic boxes which are needed.

An alternative momentum management system uses a double gimballed momentum wheel in which a single momentum wheel is mounted within a two axis gimbal fixed to the spacecraft. Actuation of the gimbals to re-orient the momentum wheel provides control of the angular momentum within the spacecraft body as required for control while limiting the total number of rotors to just a prime and redundant system. A conventional double gimballed wheel consists of a momentum wheel mounted on a platform which can articulate. A trio of stepper motor driven linear jack screws is used to provide the tilt capability. The three actuators are needed to provide some redundancy in each wheel since jack screws can wear and eventually fail. A total angular deviation of about 6 degrees is adequate for this configuration. In principal, the double gimballed wheel has all the advantages of three reaction wheels with a momentum control capability in all directions while using but a single wheel. However, it suffers from two major disadvantages. The first is a result of the actuators which operate in discrete steps. This limits the pointing accuracy and requires careful nutation control. The second disadvantage is the complex mechanical configuration. It has numerous points of possible failure. These extra mechanisms add mass and cost and unreliability which are not desirable for small, low cost satellites.

It is noteworthy that all of the current momentum management approaches, provide momentum control only and cannot be used to measure body rotation rates.

It is, therefore, desirable to provide a novel system and method for momentum management in spacecraft attitude control that obviates or mitigates the disadvantages of the prior art.

SUMMARY OF THE INVENTION

According to one aspect of the present invention there is provided, in a momentum management system for attitude control of a spacecraft, the system having:
  a housing to be fixed to the spacecraft;
  a momentum wheel rotor in the housing and rotatable about a rotor axis for storing angular momentum;
  a gimbal assembly mounting the rotor in the housing;
  a drive having an output rotatable about a drive axis, the output being coupled to the rotor for rotating the rotor; and
  a torque generation device for imparting torque to the rotor about axes orthogonal to the drive axis, the improvement wherein:
  the gimbal assembly comprises a gimbal ring coupling the drive output to the rotor; and
  the gimbal ring includes respective flexure joints connecting the gimbal ring to the drive and the rotor, the flexure joints being configured to permit the rotor to tilt about two flexure axes orthogonal to the drive axis, to incline the rotor axis through a range of angles from about 0 degrees to about 7 degrees with respect to the drive axis under the control of said torque generation device.

Thus, the gimbal suspension for the rotor is a spinning gimbal. Spinning gimbals have been used in the past with tuned rotor gyros (TRG) as rate sensors. Examples are found in U.S. Pat. Nos. 4,528,864 and 4,825,713. The requirements for these devices conflict with those of momentum actuators. A TRG operates about a null (zero tilt angle) with respect to the case of the device. Torque coils are used to null the tilt angle, with the required input to the coils serving as the measure of the rotation rates being monitored. This contrasts with the present momentum management system, where torque is applied to the rotor to cause a rotation out of the null position and thus cause an alteration of the spacecraft attitude.

The preferred flexure joint is formed from two resilient, crossing webs. The webs have ring ends connected to the body of the gimbal ring and mounting ends connected to either the drive and the rotor.

The system may include a launch restraint system to limit movement of the rotor along the drive axis, including a stop mounted on the drive output and a cage mounted on the rotor, surrounding the stop. Under high acceleration, the cage engages the stop to support the rotor, relieving excess stress on the flexures of the gimbal suspension. The launch restraint system may also include deflection stops adjacent opposite sides of each web of each flexure for limiting deflection of the webs.

According to another aspect of the present invention there is provided a momentum management system for attitude control of a spacecraft, the system having:
  a housing;
  a rotor drive having an output rotatable about a drive axis, the drive axis being fixed with respect to the housing;
  a gimbal assembly connected to the drive output;

a momentum wheel rotor rotatable about a rotor axis for storing angular momentum, the rotor being mounted on the gimbal to be rotated about the drive axis by the rotor drive and for tilting movement about transverse axes orthogonal to the drive axis;

a torque generation device for tilting the rotor about the transverse axes; and a sensor for measuring the rotation of the rotor about the rotor axis, the sensor comprising:
  a part spherical surface on the momentum wheel rotor;
  a pattern formed on the part spherical surface; and
  a sensor mounted at a fixed position relative to the housing and positioned adjacent the part spherical surface for detecting the passage of the pattern past the sensor with rotation of the rotor.

TRGs use magnetic sensors to measure tilt error, but these devices can only operate over an extremely small tilt angle, amounting to fractions of a degree. They are null sensors and become rapidly nonlinear as the tilt angle deviates from zero. The momentum wheel rotor must be capable of a much larger tilt range, and the sensor must be able to operate reliably over a wide tilt range. The part spherical rotor surface ensures that the spacing between the sensor and the rotor pattern remains essentially constant regardless of the tilt angle.

To detect the tilt angle, the pattern may have leading and trailing edges with a spacing circumferentially of the rotor that varies with position along the rotor axis. It may, for example be triangular. The sensor may then detect the leading and trailing edges of the pattern. The timing between the edges as detected by the sensor may be used to determine the tilt angle of the rotor.

The sensor may be an optical sensor responding to changes in reflected light from an optical emitter. It may alternatively be a magnetic sensor responding to changes in the magnetic field as the pattern moves past the sensor.

According to another aspect of the present invention there is provided a momentum management system for attitude control of a spacecraft, the system having:
  a drive having a rotatable output about a drive axis;
  a gimbal assembly connected to the drive output;
  a momentum wheel rotor rotatable about a rotor axis for storing angular momentum, the rotor being mounted on the gimbal to be rotated by the drive and for rotation about transverse axes orthogonal to the drive axis;
  a torque generation device for imparting torque to the rotor about the transverse axes, the torque generation device comprising:
    an inner permanent magnet annulus mounted on the rotor, concentric with the rotor axis and with poles spaced apart by a pole spacing dimension along the rotor axis;
    an outer permanent magnet annulus mounted on the rotor, concentric with the rotor axis and spaced radially from the inner permanent magnet annulus, with poles spaced apart by the pole spacing dimension along the rotor axis;
    a torque coil annulus between the inner and outer permanent magnet annuli and concentric with the drive axis, the torque coil annulus having a core with a dimension axially of the drive axis that is greater than the pole spacing dimension.

By spacing the upper and lower parts of the torque coil at a distance greater than the pole spacing of the permanent magnets, the variation in the torque scale factor is reduced significantly to be nearly constant over the operational tilt range of the rotor. This makes calibration of the device as a rate sensor much simpler.

According to a further aspect of the present invention there is provided a momentum management system for attitude control of a spacecraft, the system having:
  a drive having a rotatable output about a drive axis;
  a gimbal assembly connected to the drive output;
  a momentum wheel rotor rotatable about a rotor axis for storing angular momentum, the rotor being mounted on the gimbal to be rotated by the drive and for rotation about transverse axes orthogonal to the drive axis;
  a torque generation device for imparting torque to the rotor about the transverse axes, the torque generation device comprising:
    inner and outer permanent magnet annuli mounted on the rotor, concentric with the rotor axis and spaced apart radially with respect to the rotor axis;
    a torque coil annulus between the inner and outer permanent magnet annuli and concentric with the drive axis; and
    a ferromagnetic cage mounted on the rotor and surrounding the inner and outer permanent magnet annuli and the torque coil annulus.

The ferromagnetic cage is used minimize disturbance torques introduced by external magnetic fields. Unlike with TRGs, this function cannot be provided by the housing of the device because the large rotor tilt angles relative to the housing during operation would induce significant magnetic hysteresis. This will compromise the rate sensing precision that can be obtained.

Because the magnetic properties of permanent magnets are temperature dependent, thermal sensors may be used within the ferromagnetic cage for measuring the temperature of the magnets. This can be used as an input to the calibration of the system. The preferred sensors are miniature non-contact infra-red (IR) sensors, for example microbolometers mounted on the support for the torque coils inside the magnetic cage. The cage preferably has its inner surface coated with a high emissivity material, for example flat black paint, so that the IR signal from the sensor is not dependent on rotor tilt, but only on the temperature of the magnets. This avoids any need to thermally control the whole device.

According to another aspect of the present invention there is provided, in a method of manufacturing a gimbal assembly comprising:
(i) providing a substantially cylindrical inner ring;
(ii) providing a substantially cylindrical outer ring larger than the inner ring;
(iii) mounting the inner ring coaxially within the outer ring;
(iv) forming openings through opposite lateral sides of said inner and outer rings by wire electric discharge machining with substantially planar flexures extending across the openings and inclined to the axes of the rings;
(v) separating the inner and outer rings;
(vi) re-orienting the inner and outer rings to re-align the openings with the flexures perpendicular to one another; and
(vii) welding said inner and outer rings together to form a gimbal ring, the improvement comprising:

after separating the rings and before re-orienting the rings, removing re-cast material from the flexures.

Where the gimbal is machined using travelling wire electrical discharge machining (EDM) techniques, the flexures are left with an uneven surface and a re-cast layer that is susceptible to fatigue crack initiation. With small deflections and low stresses, as with a TRG, this is not a significant problem. However, with the momentum management system, the tilt angles and stresses are relatively large and the surface treatment to remove the re-cast layer significantly improves the fatigue life of the flexures.

The re-cast removal process may include treating the flexures with an abrasive slurry. They may also be chemically etched to provide a smooth surface finish. Other surface modification techniques may be applied, for example micro-peening, to further extend the fatigue life of the flexures.

According to yet another aspect of the present invention there is provided a method of tuning a gimbal ring for use in a gimbal assembly, the ring comprising a substantially cylindrical gimbal ring with a centre of mass, a ring axis through the centre of mass, slots in the ring separating diametrically opposed mounting sections of the ring from the remainder of the ring, and resilient flexures coupling respective ones of the mounting sections to the remainder of the ring, the flexures having flexure axes passing through the centre of mass, the method comprising removing material from axially opposite ends of the ring so as to maintain the centre of mass of the ring at the intersection of the ring axis and the flexure axes.

Trimming the gimbal ring provides for a large range of tuned speeds without changing any other design features of the device.

According to another aspect of the present invention there is provided a momentum management system for attitude control of a spacecraft, the system having:

a rotor drive having an output rotatable about a drive axis at a variable drive output speed;

a gimbal assembly connected to the drive output;

a momentum wheel rotor rotatable about a rotor axis for storing angular momentum, the rotor being mounted on the gimbal to be rotated about the drive axis by the rotor drive and for tilting movement about transverse axes orthogonal to the drive axis;

a torque generation device for tilting the rotor about the transverse axes;

a sensor for measuring the speed of the rotor rotation about the rotor axis and generating a sensor output representative of said speed; and drive control means responsive to the sensor output for varying the drive output speed so as to maintain the speed of the rotor rotation substantially constant.

The kinematics of the gimbal assembly cause the rotor angular velocity to oscillate slightly at a frequency of twice the spin rate when the drive is driven at a constant angular velocity. This oscillation produces large loads on the gimbal flexures and also reduces the rate sensing accuracy. Therefore, the speed control for the drive uses the rotor speed and mot the drive speed as its input speed. The rotor is then driven at a constant speed, with the drive speed oscillating to compensate. The moment of inertia of the very small compared to that of the rotor so that the drive oscillation has a negligible effect on gimbal flexure loading and does not significantly affect the rate sensing measurements.

According to a further aspect of the present invention there is provided a combined momentum management and rate sensor apparatus for spacecraft attitude control, comprising:

a rotor drive having an output rotatable about a drive axis at a variable drive output speed;

a gimbal assembly connected to the drive output;

a momentum wheel rotor rotatable about a rotor axis for storing angular momentum, the rotor being mounted on the gimbal to be rotated about the drive axis by the rotor drive and for tilting rotation about transverse axes orthogonal to the drive axis;

a torque generation device for rotating the momentum wheel rotor about the transverse axes to vary the spacecraft attitude;

a sensor for measuring the rotor rotation about the transverse axes, and for generating a sensor output representative of the measured rotation;

a processor for receiving the sensor output and calculating from the sensor output spacecraft rotation rates about said transverse axes; and an attitude control for controlling operation of the torque generation device in accordance with the rotation rates calculated by the processor.

The device thus acts as both a momentum control actuator and as a rate sensing gyro. This is a considerable simplification of systems that use separate elements for these different functions. In the preferred combined device, the sensor measures both the rotor speed and tilt. Because the device provides both functions, rate measurements are required when operating at a non-tuned speed, the rotor is at a non-zero tilt angle and the tilt angle is varying with time. To improve precision under these conditions, the control system includes notch filters for filtering frequencies from the sensor output equal to the rotor speed of rotation and twice the rotor speed of rotation.

BRIEF DESCRIPTION OF THE DRAWINGS

Presently preferred embodiments of the present invention will now be described by way of example only, with reference to the attached drawings in which:

FIGS. 4a and 4b are schematic views of a cross flexure pivot, showing the flexure pivot with no relative rotation and with relative rotation, respectively;

FIGS. 5a and 5b show isometric views of outer and inner gimbal rings, respectively;

FIGS. 6a and 6b are cross sectional views of a launch restraint stop and cage, showing the rotor in undeflected and deflected positions, respectively;

FIG. 7 shows a cross section of a launch restraint for a flexure pivot;

FIG. 12 is block diagram of a spacecraft attitude control system;

DETAILED DESCRIPTION

Embodiments of a momentum management system 10 according to the present invention will now be described with reference to the accompanying drawings. Momentum management system 10 is a form of double gimballed momentum wheel based on a spinning gimbal assembly 12, as opposed to the conventional non-spinning gimbal. A spinning gimbal provides the capability to control the angular momentum about three axes, and to provide two axes of angular velocity measurement at the same time.

Figure 1:
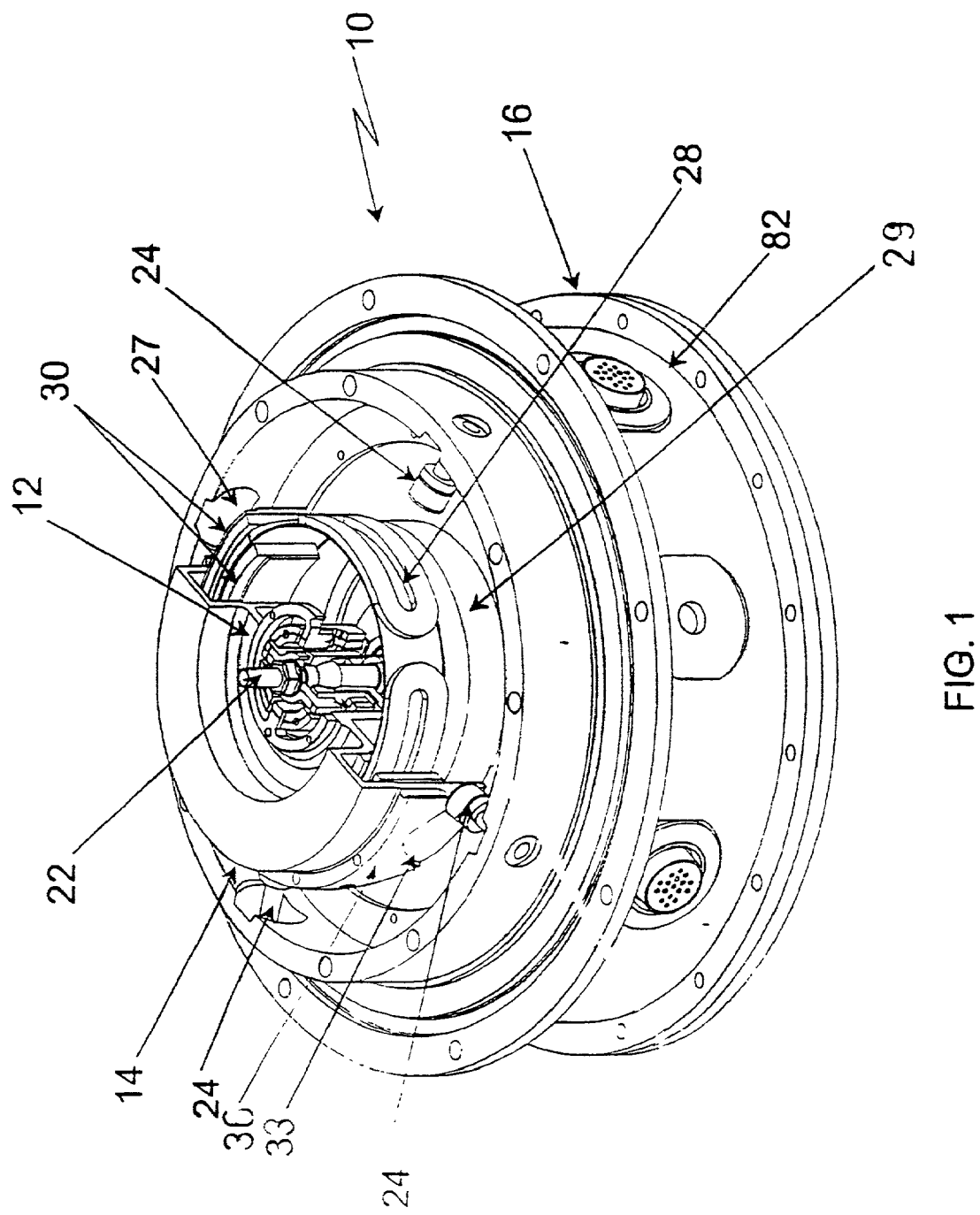
FIG. 1 is an isometric view, partially cut-away of a momentum management system according to the present invention.
Figure 2:
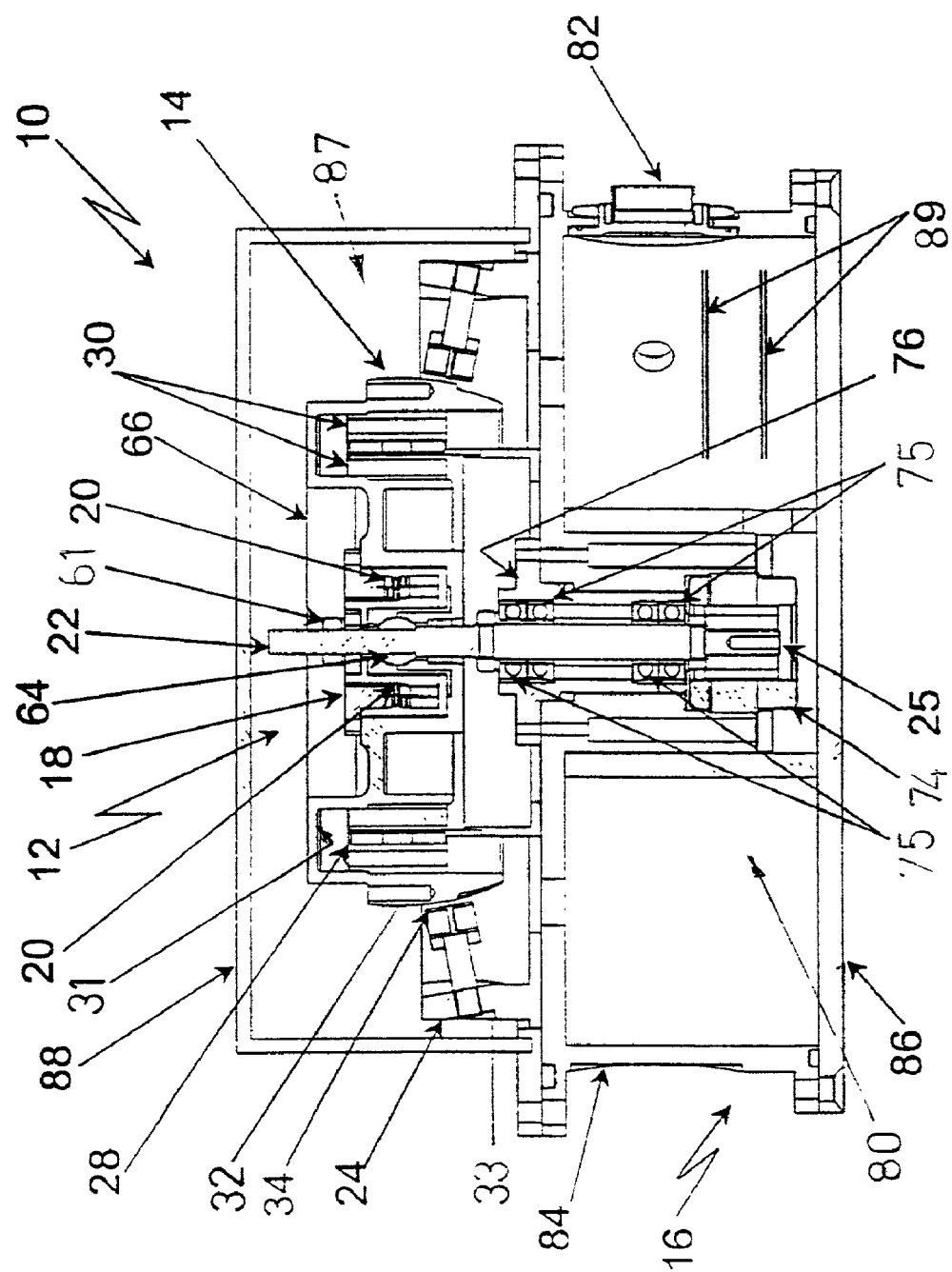
FIG. 2 is a cross section of the system of FIG. 1.

Referring particularly to FIGS. 1 and 2, system 10 includes a rotor 14 mounted in a housing 16 of non-ferromagnetic material and suspended by a gimbal assembly 12. Gimbal assembly 12 includes a cylindrical gimbal ring 18. Four flexure joints 20 are arranged orthogonally around the ring. The ring is connected through the flexure joints to the rotor 14 and to a drive shaft 22 which is the drive output of a drive 25 including a motor 74 mounted in the housing. The gimbal assembly 12 behaves somewhat like a universal joint, allowing the drive shaft and rotor to rotate about non-aligned axes. Four sensors 24 are mounted on the housing around the rotor to measure the tilt angles of rotor 14 and the rotor speed. An annular torque generator 27 surrounds the rotor and serves to control the rotor tilt angles.

The momentum management system 10 may be treated as a system of three rigid bodies coupled by flexure joints. The three bodies are: drive 25, including the motor 74 and its drive shaft 22; gimbal ring 18; and rotor 14. The drive shaft 22 is coupled to the gimbal ring 18 by two diametrically opposed flexures 20a. The gimbal ring 18 is in turn coupled to rotor 14 by two other diametrically opposed flexures 20b. A full non-linear three body analysis, as described in detail below, can be simplified considerably by assuming that the tilt angles are small, in which case linear equations result and the problem reduces to an equivalent two body problem in which motor 74 is controlled to a constant speed. The linear analysis provides insight but is not completely accurate as the tilt angles increase beyond more than a few degrees. A fill non-liner analysis of the three body problem cannot be solved explicitly but can be simulated. In this case it is found that if the motor speed control system is derived from error signals obtained from rotor 14 rather than from motor 74, and with a wide bandwidth, then the three body system approaches the two body linear system in performance. These results allow for calibration of system 10 as a rate sensor as well as an actuator.

The torque generator 27 includes radially spaced inner and outer permanent magnet rings or annuli 30 mounted in a downwardly open channel 31 in the rotor 14, as shown in FIGS. 1 and 2. The torque generator 27 also includes four torque coils 28 arranged in two pairs spaced uniformly around the drive shaft 22. The coils 28 are mounted on the housing by a torque coil stand 29, as shown in FIG. 2, and are located between the two permanent magnet rings 30 in rotor 14. Coils 28 are made using a very fine copper wire (e.g., 32 gauge) wound around a form with a large number of turns (e.g., 400 turns). When a voltage is applied to coils 28, the resulting current in coils 28 interacts with the magnetic flux B in the gap between rotor magnets 30, imparting an axial force on rotor 14. A pair of coils 28, opposite each other, and with the current running in opposite directions, is used to impart a moment on rotor 14 without imparting a net force. The torque required to move rotor 14 or hold it fixed is related to the angular rates of the spacecraft. Hence, the measured current in coils 28 can be used in computing the rate measurements about two orthogonal axes.

Figure 8:
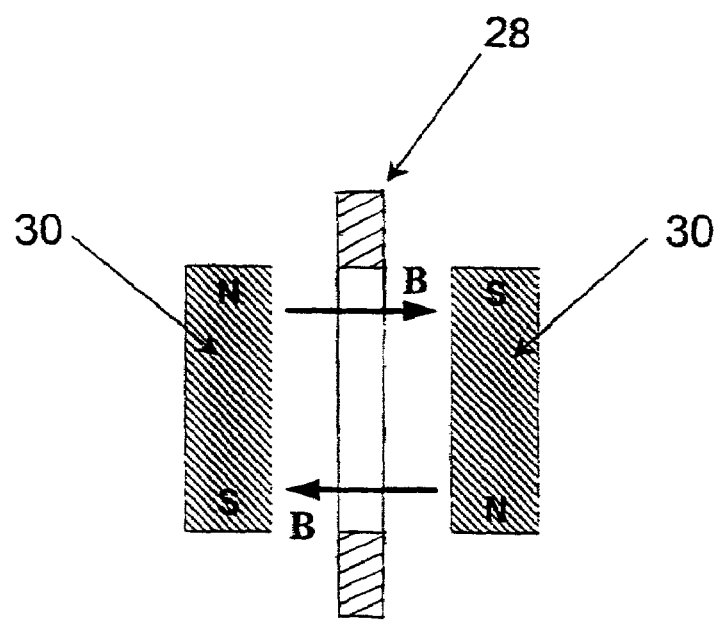
FIG. 8 is a cross section of one embodiment of torque coils and axial rotor magnets.
Figure 9:
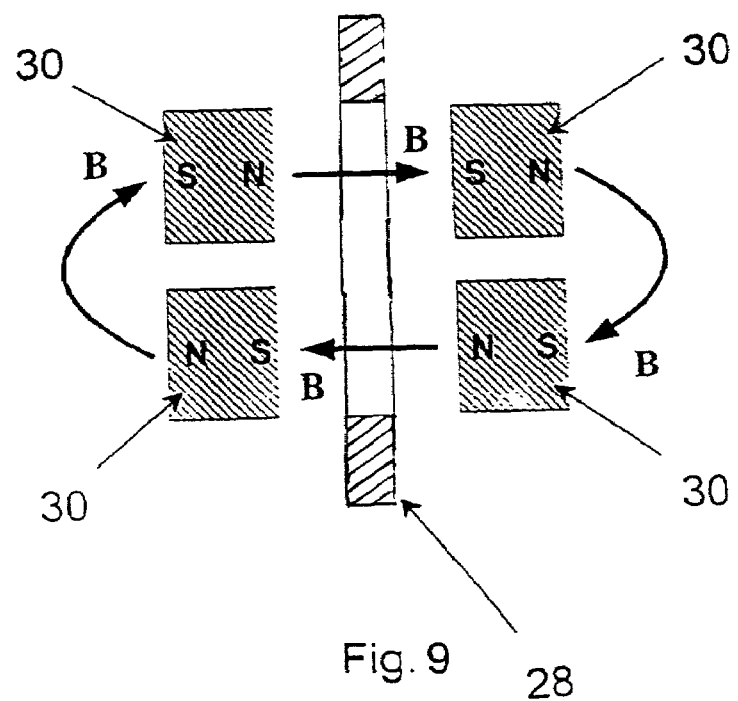
FIG. 9 is a cross section of another embodiment of torque coils and radial rotor magnets.

A cross section of coils 28 and rotor magnets 30 is given in FIG. 9, showing the magnetic configuration and the direction of the magnetic flux in the gap where coils 28 are located. The configuration shown in FIG. 8 uses permanent magnets that are axially magnetized. In this case, the rotor material used is non-ferromagnetic allowing the flux to be concentrated in the gap between the magnets. Also with this configuration, the outer magnet width can be sized so that the magnetic flux external to the rotor can be made very small, Another possible magnetic configuration is one that uses permanent magnet rings that are radially magnetized. This configuration is shown in FIG. 9. In this case, rotor 14 is made from a ferromagnetic material I 0 to provide a flux path between the magnets.

In the permanent magnet design of FIG. 8, the axial length of the magnets relative to the torque coil geometry determines performance. If one plots the magnetic strength along the axial direction in the middle of the gap in between magnets 30, the flux will have sharp peaks at the ends of magnets 30. However, over the tilt range of rotor 14, it is highly desirable to maintain a constant torque scale factor (i.e., N–m/Amp) from the torque coils 28 to improve the calibration. This can be accomplished by selecting the length of magnets 30 appropriately. If the magnets are too short, the torque scale factor is reduced as the tilt angle is increased. Similarly if the magnets too long, the torque scale factor increases as the tilt angle is increased. A similar situation exists with the radial magnets shown in FIG. 9, however in this case, the axial spacing between the upper and lower magnets is the determinant parameter. The radial magnets can have an advantage over the axial magnets as they tend to flatten out and widen the magnetic flux peaks which helps to further reduce the variation of the torque scale factor over the range of tilt angles. The desired scale factor reduction can be achieved by making torque coil with a core with a dimension axially of the drive axis that is greater than the axial pole spacing dimension, that is the distance between the poles of the permanent magnet rings. With this relationship, the scale factor remains nearly constant over the full operational tilt range.

The rotor 14 has an outer, part spherical surface 32 as shown most particularly in FIG. 2. A pattern of relieved triangular areas 33 is etched into this surface as shown in FIG. 1. This etched pattern 33 is used with the tilt sensors 24 to establish the tilt angles of rotor 14. The tilt sensors 24 inductive pick-offs 34 that use a small sensing coil located very near the part spherical surface 32, as shown in FIG. 1. The pattern 33 on rotor 14 introduces a changing gap size between tilt sensor 24 and the ferromagnetic rotor surface as rotor 14 rotates past one of tilt sensors 24. This changing gap introduces a signal in the tilt sensor coil 34 that can be used to measure the rotor tilt. The principle is that as a single triangular etched pattern 32 rotates past the sensors 24, the leading edge of the pattern 32 causes a current spike in sensing coil 34 and the trailing edge of pattern 32 causes a negative current spike. Since pattern 32 is triangular, the time between the leading edge pulse and the trailing edge pulse is related to the rotor tilt for a given rotor speed. When tilt sensor 24 is near the top part of pattern 32, the pulses are further apart, and when sensor 24 is near the bottom part of pattern 32, the pulses are closer together. To remove any dependence on the rotor spin rate, the ratio T1/T2 is defined where T1 is the time between the leading edge pulse and the trailing edge pulse and T2 is the time between the leading edge pulses of two consecutive patterns. Then the tilt angle is proportional only to the ratio T1/T2 (assuming the spin rate remains constant over the measurement interval). Tilt sensors 24 are arranged in pairs of diametrically opposed sensors as shown in FIG. 1, with one pair used to measure the tilt about an axis defined by the two sensors and the other pair is used to measure the tilt about another axis orthogonal to the first.

With the permanent magnet design shown in FIG. 9, the rotor material is non-ferromagnetic (e.g., stainless steel), to actuate the inductive pick-offs, a ferromagnetic ring 36 is press fit onto the stainless steel body of the rotor and the pattern 33 is etched into the ferromagnetic ring. Other embodiments may use other types of senor and pattern, for example a visible pattern and an optical pick-off.

The top surface of rotor 14 is polished to a mirror finish to allow for fine calibration of system 10.

Figure 3:
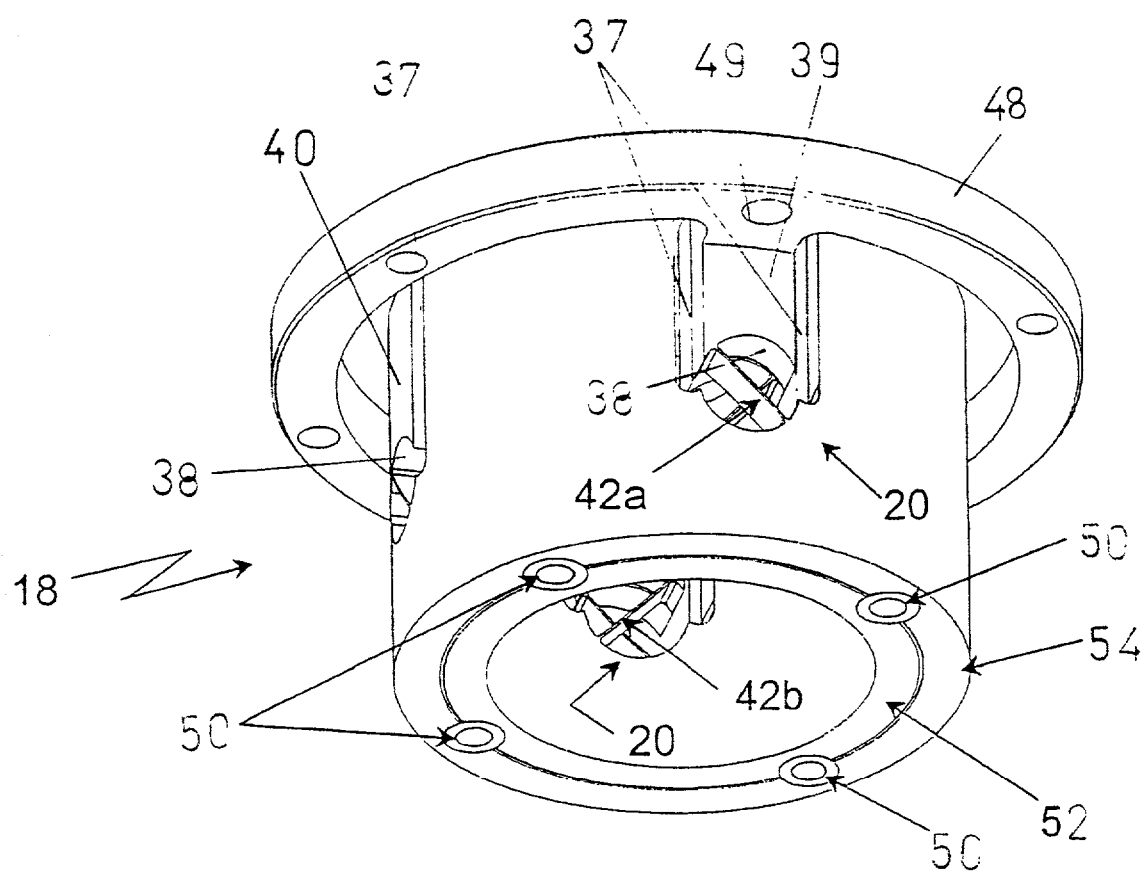
FIG. 3 is an isometric view of a gimbal.

The configuration of the gimbal assembly 12 is illustrated most particularly in FIGS. 3, 4 and 5. The gimbal attaches the rotor 14 to the drive shaft 22. It incorporates the flexure joints 20 that permit the rotor 14 to tilt about two axes x and z orthogonal to the axis y of shaft 22. Two of the flexure joints, diametrically opposed and designated 20a in the drawings, are used to couple the gimbal ring 18 to the rotor, while the other two diametrically opposed flexure joints, designated 20b, are used to couple the gimbal ring 18 to the drive shaft 22. The gimbal assembly includes four pairs of axial slots 37 in the ring, with the slots of each pair extending from the top end of the gimbal to a respective circular aperture 38 through the gimbal ring. The slots separate four spaced mounting sections 39 and 40 of the ring from the remainder of the ring. Mounting sections 39 are diametrically opposed, as are mounting sections 40. The resilient flexures 20 couple the mounting sections 39 and 40 to the remainder of the ring. Each flexure has two independent, substantially planar webs 42a and 42b extending across a respective one of the circular openings to join the gimbal ring to the associated mounting section. The webs cross, in this embodiment at right angles, with one web inside the other. The points 44 at which the webs cross are on two orthogonal flexure axes which pass through the centre of mass of the gimbal.

At the top of the gimbal is a drive shaft mounting flange 45. This has a generally circular centre 46 and two diametrically opposed spokes 47 that are secured to the gimbal ring mounting sections 40. The drive shaft mounting flange is fixed to the drive shaft to rotate the gimbal with the shaft. The other two mounting sections 39 connected to a rotor mounting flange 48 around the gimbal ring by radial spokes 49.

The cross configuration of the webs 42a and 42b allows the rotor mounting flange, and the rotor to which it is attached, to rotate relative to drive shaft mounting flange and the drive shaft while keeping the centre of rotation very close to the intersection of the flexure axes.

The material used for webs 42 should have a resistance to fatigue sufficiently high that under the stresses encountered during normal operation the flexures 20 will have an essentially infinite life. In a presently preferred embodiment, the material used for gimbal 18 and webs 42 is AerMet 100 which has a yield stress of nearly 300 ksi and a fatigue limit of over 100 ksi.

Gimbal ring 18 also has a set of balance screws 50 as shown in FIG. 3 that can be adjusted during calibration to ensure that the mass centre of gimbal ring 18 is located at the intersection of the flexure axes.

When spinning rotor 14 is oriented so that there is an angle between drive shaft 22 and the rotor spin axis, gimbal ring 18 tends to flutter with a frequency of twice the spin frequency. The tuned speed of system 10 is that which causes the inertial forces resulting from the gimbal ring flutter to counter the torsional spring forces arising from deformed flexures 20 so that, to a first order approximation rotor 14 behaves very nearly like a free rotor in space. This is a feature that permits system 10 to be used as a precise rate sensor.

Gimbal 18 is designed so that the tuned speed of the system 10 can be adjusted by simply changing the height of gimbal ring 18 without altering any of the interfaces between gimbal assembly 12 and rotor 14 or drive shaft 22. FIG. 3 shows the full height gimbal ring 18 which corresponds to the lowest possible tuned speed. A reduced height gimbal ring corresponds to a higher tuned speed. This easily adjustable tuned speed permits the system 10 to be easily adapted for a variety of speed ranges, making it applicable to a broad class of spacecraft. The reduction in gimbal ring height can be easily implemented for each individual system 10 produced, thereby tailoring the tuned speed to specific customer requirements.

The spokes 47 of the drive shaft mounting flange 45 and the spokes 49 of the rotor mounting flange 48 are designed to deform under launch loads in reduce the deflection of flexures 20 in response to the deflection of rotor 14 relative to drive shaft 22. The magnitude of the rotor deflection under load should be sufficient to engage a launch restraint system described in the following.

The gimbal is fabricated from two concentric cylinders 52, 54 that are shown in FIGS. 5a and 5b, respectively. Initially, the inner and outer cylinders are machined separately. They are then assembled concentrically. The apertures 38 are then machined into the cylinders, leaving webs 42 in place. At this point, the outer webs 42a and inner webs 42b are aligned. The cylinders are machined using, for example, a wire Electric Discharge Machining (EDM) process. Outer cylinder 54 is then rotated 180 degrees. This procedure creates the cross-flexure configuration of the flexures 20. Inner and outer cylinders 52 and 54 are welded together at the top to form gimbal ring 18. The two cylinders are then welded at the bottom as well. A sink EDM process can then used to remove the material required to form slots 37 to separate the mounting sections 39 and 40 shown in FIGS. 5a and 5b by the dashed lines on gimbal inner and outer cylinders 52 and 54. The drive shaft and rotor mounting flanges are then secured in place.

The system 10 incorporates a launch restraint system 61 to limit the deflection of rotor 14 during launch to ensure that flexures 20 in gimbal assembly 12 are not over-stressed. Referring to FIGS. 6a and 6b, a stop in the form of ball 64 is mounted on the drive shaft 22. A cage in the form of part spherical cup 66 is mounted on the hub 68 of rotor 14. Under normal operational conditions, the rotor 14 is suspended by the flexures 20 so that the cup 66 in the rotor hub 68 does not contact the ball 64. The centre of rotation of rotor 14 is located at the centre of caging ball 64, so that as rotor 14 tilts the gap 70 between the ball 64 and the cup 66 is maintained. Therefore, during normal operational conditions, the ball 64 does not come into contact with rotor 14 and hence does not affect the operation of system 10. However, when loads are applied to rotor 14 during launch and also during handling, rotor 14 may be deflected until the cup 66 engages the ball 64 as shown in FIG. 6b. The ball 64 therefore limits the maximum deflection of rotor 14 and thus limits the maximum stress in gimbal flexure webs 42. Although FIG. 6b shows a rotor deflection in the vertical direction, the ball 64 can limit deflection of rotor 14 in any arbitrary direction.

To limit the angular deflection of rotor 14, stops 71 are incorporated into rotor hub 68, such that as rotor 14 is tilted to the maximum allowable angle, the hub 68 contacts drive shaft 22. To limit the angular deflection and the maximum stress in webs 42 due to the tilt of rotor 14. The size of gap 70 is selected so that webs 42 cannot be overstressed even when rotor 14 is tilted to the maximum angle.

As shown in FIG. 7, the launch restraint system includes deflection stops 72 in the circular apertures 38 to ensure that webs 42 in gimbal flexures 20 will not be overstressed. Deflection stops 72 are machined out of the parent gimbal ring material during the wire EDM operation described above. A small gap 73, in the range of 0.1524–01778 mm, is formed between web 42 and deflection stop 72. such that under normal operating conditions of 1 G, flexure 42 does not touch deflection stop 72. However, under high loads, such as launch and handling loads, the lateral deflection of flexure 42 is restrained at the midpoint, allowing it to carry more load. The buckling behaviour of flexure 42 in this case is forced into a second mode that effectively increases the buckling load by a factor of 4. Hence, it is possible to design webs 42 that will not be over stressed in the worst loading conditions.

Referring to FIG. 2, a spin motor 74 is positioned at the end of drive shaft 22 to drive the shaft at the required speed. The drive shaft is supported in the housing by bearings 75 and is connected to the gimbal assembly 12 at the top end by the mounting flange 45 on the gimbal. The bearings 75 are housed in a separate thermal sleeve 76 made from the same material as the bearings and drive shaft 22, thus reducing thermally induced stresses on the bearings. The thermal sleeve 76 also permits removal of the complete rotor assembly, including the drive shaft, bearings, gimbal and rotor, from the housing 16 without disassembly. The drive shaft 22, bearings 76 and the thermal sleeve 76 are a single subassembly that can be assembled and tested separately before installing into system 10.

The spin motor 74 is a brushless DC electric motor that is integrated into a lower compartment 80 in a base 82 of housing 16, as shown in FIG. 2. Permanent magnets are mounted on the shaft and the stator is integrated into the housing 16.

Housing 16 includes a case 84, a bottom cover 86, and a top cover 88. Top and bottom covers 86, 88 have O-ring seals and connectors that are hermetically sealed so that the complete system 10 can be evacuated and placed into a vacuum. This reduces windage effects on rotor 14 and creates a thermal environment more similar to that in space to allow for more precise calibration on the ground.

Housing 16 is also designed to separate an electronics package 89 and spin motor 74, which are located in the lower compartment 80, from gimbal assembly 12 located in the upper compartment 87. This permits thermal isolation and active control of the rotor temperature while the lower compartment 80, where the primary power/heat dissipating devices are located, does not require active thermal control and can have a good thermal interface to the spacecraft.

A theoretical analysis of system 10 will now be provided, with reference to the preceding structural description. For present purposes it can be assumed that housing 16 and motor shaft 22 are fixed in inertial space. The three elements are motor drive shaft 22, gimbal ring 18 and rotor 14. Motor 74 is driven at a constant speed $\omega_s$. Gimbal ring 18 is connected to shaft 22 by a pair of torsion flexures 42a aligned along the x-axis. Rotor 14 is connected to gimbal 18 by another pair of torsion springs 42b aligned along the y-axis. The x and y axes are spinning around the spin axis (z-axis) and gimbal 18 can rotate about the x-axis while rotor 14 can In turn rotate about the gimbal's y-axis. In the following, the spinning coordinates are retained until the results are transformed to non-spinning coordinates appropriate for the angle sensors, torque generators (torquers) and the rebalance control loop.

Let $\phi$ be the angle of rotation of gimbal ring 18 about the x-axis and let $\theta$ be the angle of rotation of rotor 14 with respect to gimbal 18, about the y-axis. The two body dynamic equations may be derived using a vectorial or a Lagrangian dynamic formulation assuming that motor 74 speed is a constant. It will be assumed that the moment of inertia of gimbal 18 about the z or spin axis is $I_{gs}$ and that gimbal 18 is symmetric with transverse inertia $I_{gt}$. Similarly the spin axis inertia of the rotor 14 is $I_{rs}$ and the symmetric transverse inertia is $I_{rt}$. The dynamic equations that result are:

$$(I_{rt} + I_{gt})\dot\omega_{rx}C_\theta - I_{rt}(\omega_{rx}\omega_{gy}S_\theta + \omega_{rx}\omega_{gt}) + I_{rs}\omega_{rz}\omega_{gy}C_\theta + (I_{rs} + I_{gt})\dot\omega_{rz}S_\theta +$$
$$(I_{gt}\omega_{gz} + I\,\omega_{rz}C_r - I\,\omega_{rx}S_\theta)(\omega_{ry} - \omega_s S_\theta) - (I_{gz} - I_{gx})\omega_{gy}\omega_{gz} + k_x\phi = 0$$

and $$I_{rt}\dot\omega_{ry} + I_{rt}\omega_{rx}\dot\omega_{gz} + k_x\theta = 0$$

where:
$I_{rs}$ rotor inertia about the spin axis
$I_{rt}$ rotor inertia about the transverse axis
$I_{gs}$ gimbal inertia about the spin axis
$I_{gt}$ gimbal inertia about the transverse axis
$k_x$ x-axis flexure spring constant
$k_y$ y-axis flexure spring constant
$\phi$ angle of rotation of the gimbal about the x-axis
$\theta$ angle of rotation of the gimbal about the y-axis
$C_\theta$ cos$\theta$
$S_\theta$. sin$\theta$
$C_\phi$ cos $\phi$
$S_\phi$ sin $\phi$
$\omega_s$ motor spin speed
$\omega_{gx}$ gimbal angular velocity about the x-axis
$\omega_{gy}$ gimbal angular velocity about the y-axis
$\omega_{gz}$ gimbal angular velocity about the z-ax, s
$\omega_{rx}$ rotor angular velocity about the x-ax's
$\omega_{ry}$ rotor angular velocity about the y-axis
$\omega_{rz}$ rotor angular velocity about the z-axts Using small angle approximations, these reduce to $$(I_{rt} + I_{gt})\dot\omega_{rx} + (I_{gt} + I_{rs} - I_{rt})\omega_s\omega_{ry} + \left[k_x - 2\left(I_{gt} - \frac{I_{gs}}{2}\right)\omega_s^2\right]\phi = 0$$

and $$I_{rt}\dot\omega_{ry} - (I_{rs}-I_{rt})\dot\omega_s\omega_x + k_y\theta = 0$$

Define $$J = \left(I_{gt} - \frac{I_{gs}}{2}\right)$$

and the nutation frequency $$\omega_n = \frac{(I_{rs} + I_{gt})}{\left(I_{rt} + \frac{I_{gt}}{2}\right)}\omega_s$$

and introduce the Laplace transform with the auxiliary variables:

$$\alpha = \frac{k_x + k_y - 2J\omega_s^2}{2I_{rt} + I_{gt}}$$

$$\beta = \frac{k_x - k_y - 2J\omega_s^2}{2I_{rt} + I_{gt}}$$

$$\gamma = \frac{I_{gt}}{2I_{rt} + I_{gt}}$$

the characteristic equation may be found in the form:

$$(S^2 + \omega_s^2)^2 + \frac{\omega_n^2 - 2\omega_n\omega_s + 2(\alpha - \gamma\beta)}{1 - \gamma^2}(S^2 - \omega_s^2) + \frac{2\alpha\omega_s(\omega_n - 2\omega_s) + \alpha^2 - \beta^2}{1 - \gamma^2} = 0$$

There are two solutions for $(S^2 + \omega_s^2)$ $$(s^2 + \omega_s^2) = \frac{\omega_n(\omega_n - 2\omega_s) + 2(\alpha - \gamma\beta)}{2(1 - \gamma^2)}$$

$$\pm \frac{1}{2}\sqrt{\left[\frac{\omega_n(\omega_n - 2\omega_s) + 2(\alpha - \gamma\beta)}{2(1 - \gamma^2)}\right]^2 - 4\left[\frac{2\alpha\omega_s(\omega_n - 2\omega_s) + \alpha^2 - \beta^2}{1 - \gamma^2}\right]}$$

There are also two more solutions when the square root is taken. Thus there are four roots in all. The classic condition for tuning a timed rotor gyro is the condition that $\alpha=0$. that is:

$$k_x + k_y = 2J\omega_s^2$$

and if $k_x = k_y = k$ say, then the classic tuned condition is $$k = J\omega_s^2.$$

The resulting roots may be transformed to non-spinning coordinates by adding $\omega_s$, and it will then be found that the first of the roots is a resonance at twice the spin frequency and the second root is the nutation frequency. The third root is an additional resonance which presumably represents a beat frequency between the gimbal oscillations and the rotor nutation. The last of the roots is at a very low frequency and will appear as a drift rate or slow precession as the result of an off-null rotor, precessing in a coning motion. This last root, which in the two body linear model can be precisely defined, provides a determination of the effect of spin speed and rotor tilt angle on control torque requirements. Consequently, since the roots may be calculated and calibrated accurately, the effect of a rotor tilt angle and non-fined speed can be precisely calculated and subtracted from the torquer measurements so that angular velocities may be measured under any rotor condition.

A higher degree of tuning can be obtained directly from the characteristic equation if the last term is set to zero. The resulting low frequency root will then be identically zero and no drift will be experienced. This more precise tuning condition is:

$$2\alpha\omega_s(\omega_n - 2\omega_s) + \alpha^2 - \beta^2 = 0$$

which may be approximated for small values of J to give:

$$k \approx J\omega_s^2\left[1 + \frac{J\omega_s}{(2I_{rt} + I_{gt})(\omega_n - 2\omega_s)}\right]$$

This maybe considered as a condition on the flexure stiffness k. or on the spin speed $\omega_s$. For system 10, this precise tuned condition identifies the nominal spin speed. A more complete analysis can also be done by a three body analysis which includes the inertial properties of motor 74 and drive shaft 22, however, such analysis is beyond the scope of this disclosure.

A control system 90 is intended to provide high efficiency drive for motor 74; provide precise rotor speed control; process pulses for tilt sensors 24; provide drive of rotor torque coils 28; measure the torque current to the highest possible precision; monitor the system temperature; provide a microcomputer for general processing; provide a serial interface to the spacecraft attitude control system, or flight computer, to accept momentum commands (speed and 2-axis tilt), and possible software uploads; and support calibration of system 10 for temperature and non-linear effects.

Figure 10:
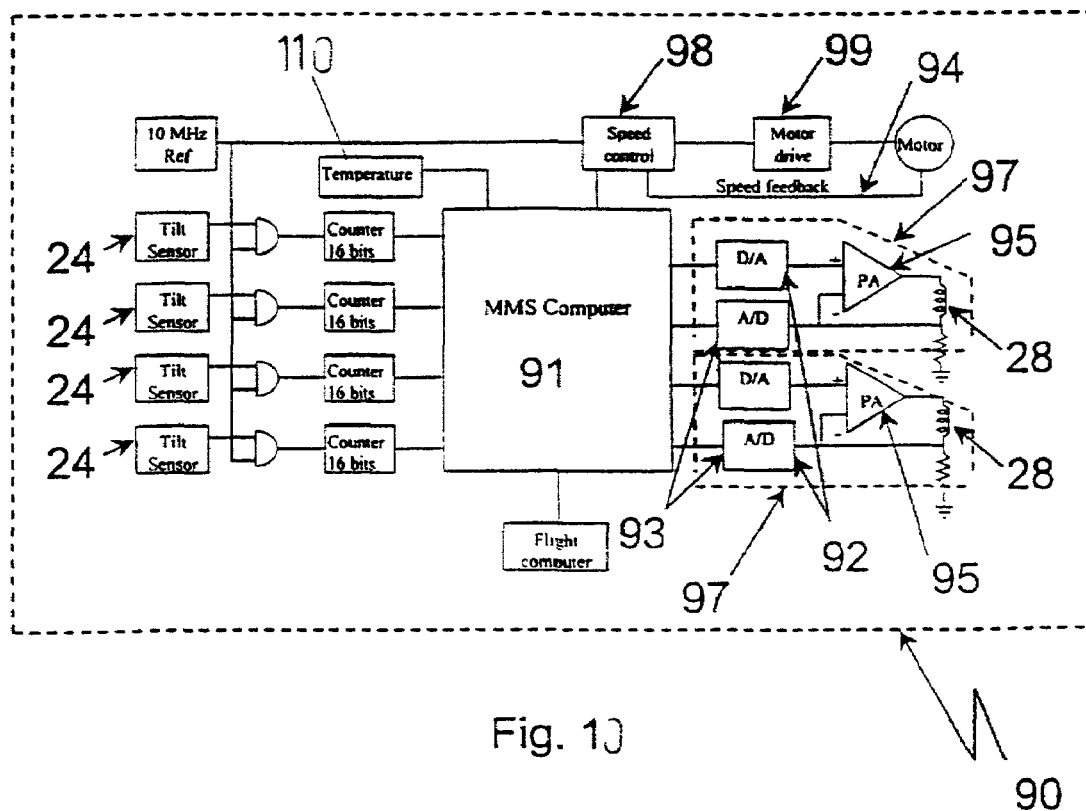
FIG. 10 is a block diagram of a momentum management control system.

A limitation with inertial measurement systems is often the electronics rather than the mechanical components. Control system 90 uses digital control to achieve the level of performance required, and includes electronics 89. Electronics 89 are built into the lower compartment 80 of housing 16 to control torque coils 28. Referring to FIG. 10, electronics 89 include a microcomputer 91 provided with appropriate software applications, A/D and D/A converters 92, 93, respectively, a phase locked loop 94, amplifiers 95, and power supplies (not shown). While there are actually four torque coils 28, two drivers 97 have been found sufficient if pairs are connected in parallel or series. Four drivers 97 can be used if it is desired to provide soft failure redundancy. Electronics 89 further include a speed control 98. and a motor drive 99.

Figure 11:
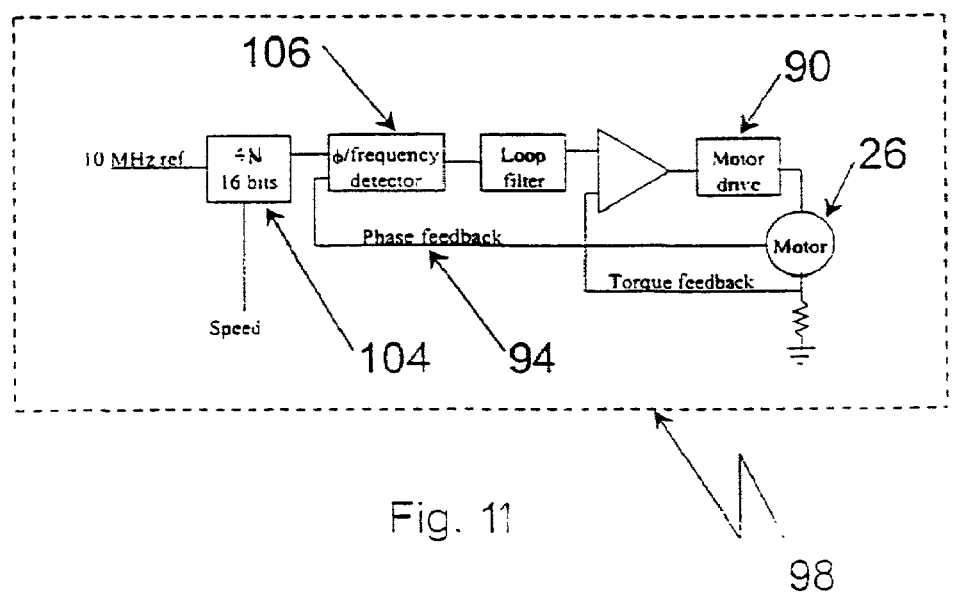
FIG. 11 is a block diagram of a motor speed control circuit of the control system of FIG. 10.

A block diagram of motor speed control circuit 98 is shown in FIG. 11. The required speed range for rotor 14 is typically 1300–1600 revolutions per minute (rpm). The speed is measured using a tachometer (not shown) with $K_z$ pulses per revolution. The reference frequency for the phase locked loop 94 is derived using a 4N counter 104. This gives non-linear control, but computer 91 can calculate the required N and the hardware is simpler that using an accumulating rate multiplier or DDS to synthesize the reference. The phase locked loop 94 uses a phase/frequency detector 106 to automatically acquire lock after a step speed change. The rotor 14 speed can be given, in revolutions per second (rps), by:

$$\text{Speed} = \frac{F_{ref}}{NK_z}$$

Where, $F_{ref}$ is the crystal oscillator frequency

N is the divider value $K_z$ is the tachometer pulses per revolution

Therefore, selecting $K_z$ is a compromise between noise and speed resolution, both of which can affect spacecraft jitter. A large $K_z$ reduces noise by increasing the frequency of the pulses at the phase detector. This shifts the frequency of the noise components at the output of the phase detector outside the bandwidth of the phase looked loop 94 where it can be attenuated by filtering. It also reduces the required gain after the phase detector which can reduce noise, However, a large $K_z$ decreases the speed resolution which increases jitter when the speed control 98 switches speeds. Assuming a 10 MHz reference, $K_z=8$, and 500:1 spacecraft to rotor momentum ratio, the spacecraft jitter caused by finite speed resolution can vary from 0.0004 to 0.005°/sec. Depending on the rotor speed.

Motor 74 consumes a significant portion of the power budget and a high efficiency motor drive 99 is required. The motor speed range is typically in the range of 1500±200 rpm to 5200±800 rpm. A suitable motor drive 99 should be ~90% efficient, and provide regenerative breaking when a negative torque is commanded.

Control system 90 also compensates for temperature dependent effects. The main source of temperature dependence is likely permanent magnets 30, particularly if ceramic magnets are used, which have a 0.6% PC temperature coefficient. A thermistor sensor 110 can provide temperature readings, and is unaffected by nuclear radiation, Microcomputer 91 processes the temperature readings to provide suitable calibration to system 10.

For earth pointing missions, the spacecraft pitch dynamics decouples from the roll-yaw dynamics which allows a pitch controller to be designed separately from a roll-yaw controller (note: the roll and yaw dynamics remain coupled due to the momentum bias). System 10 provides control torques about all three axes, and hence can be used for an attitude control system 150, as shown in FIG. 12. However, since it also provides rate measurements about the roll and yaw axes, this provides for significantly simplified and improved control system for the roll-yaw dynamics of the spacecraft. In particular, since the roll and yaw attitude errors are coupled due to the momentum bias, then system 10 is controllable by only using a roll measurement, which can be obtained using an earth sensor, and the roll and yaw rate measurements. Therefore, to achieve fine pointing control in all three axes with system 10, only a two-axis earth sensor is required that provides a pitch and roll angle measurement, where the pitch angle is used for the pitch control loop. This eliminates the need for a separate sensor (e.g., a sun sensor or a star camera) to directly measure yaw which simplifies the design of attitude 20 system 150 and significantly reduces the cost. Also, the performance of attitude control system 150 is not affected by going in and out of eclipse as it would be if a sun sensor is used to determine yaw as is the ease for most earth pointing spacecraft.

A classical PD control system can be used for the pitch axis control where the control law is expressed as:

$$M_y = -K_p \alpha_y - K_d \dot{\alpha}_y$$

where $K_p$ and $K_d$ are the proportional and derivative gains respectively, $\alpha_y$ and $\dot{\alpha}_y$ are the pitch angle and pitch rate, and $M_y$ is the control torque about the spacecraft pitch axis. The pitch angle $\alpha_y$ can be obtained from an earth sensor and the pitch rate $\dot{\alpha}_y$ is estimated using a finite difference scheme:

$$\dot{\alpha}_y = \frac{\alpha_y - \alpha_y^{pre}}{\Delta t}$$

where $\alpha_y^{pre}$ is the pitch angle at the previous sampling time and $\Delta t$ is the controller time step.

For the roll-yaw control, a direct output feedback control structure can be used as follows $$\begin{Bmatrix} M_x \\ M_z \end{Bmatrix} = [F] \begin{Bmatrix} \alpha_x \\ \omega_x \\ \omega_z \end{Bmatrix}$$

where $M_x$ and $M_z$, are the control torques about the spacecraft roll and yaw axes, [F] is the feedback gain matrix; $\alpha_x$ is the roll angle measurement, and $\omega_x$ and $\omega_y$: are the measured inertial rates of the spacecraft about roll and yaw axes respectively. This arrangement, as shown in FIG. 12, uses earth sensor measurements and measurements from system 10 directly and does not require an attitude determination algorithm to process the measurement data which further simplifies the ACS design. Since the roll and yaw axes are dynamically coupled, this control structure can provide fine pointing control in both the roll and yaw axes and there is no need to explicitly estimate the yaw angle (although this is also possible).

To establish appropriate values for the feedback gain matrix [F], a WHECON control structure 151 can be used with an added yaw rate feedback loop 152. The classical WHECON control algorithm makes use of the coupling between the roll and yaw dynamics of the system to express the control law as follows:

$$M_x = -K(\alpha_x + \tau\dot{\alpha}_x)\cos\phi$$

$$M_z = K(\alpha_x + \tau\dot{\alpha}_x)\sin\phi$$

where K is the proportional gain, $\tau$ is the damping gain, and $\phi$ is the constant offset angle (selected based on the spacecraft inertial properties), and $\alpha_x$ and $\dot{\alpha}_x$ are the roll angle and the roll rate. To improve the control performance particularly in yaw, an additional yaw rate feedback loop is designed using rate measurement about the yaw axis $\omega_z$, and also rate measurement about the roll axis $\omega_x$ is used in place of roll rate $\dot{\alpha}_x$ as provided by system 10. The roll-yaw control law therefore becomes as follows:

$$M_x = -K(\alpha_x + \tau\omega_x)\cos\phi$$

$$M_z = K(\alpha_x + \tau\omega_x)\sin\phi - K_r\omega_z$$

where $K_r$ is the rate feedback gain $\omega_x$ and $\omega_z$ are the components of the spacecraft rates about the roll and yaw axes measured by system 10. The control law can be put into matrix form and the feedback gain matrix [F] then becomes:

$$[F] = \begin{bmatrix} -K\cos\phi & -K\tau\cos\phi & 0 \\ K\sin\phi & K\tau\sin\phi & -K_r \end{bmatrix}$$

This structure for the roll-yaw control law only has four parameters to be specified to establish the gain matrix (K, τ, φ, and $K_r$), each of which has some practical interpretation for an orbiting, bias momentum spacecraft. Therefore, this makes it much easier to select an optimal set of gains that provide the best performance of attitude control system 150.

Another approach to establishing the gains is to specify the eigenvalues and eigenvectors for the closed loop roll-yaw dynamics. However, due to the coupling between the roll and yaw axes, it is difficult to relate the eigenvalues and the eigenvectors to the physical behaviour of system 10. Hence, it essentially becomes a trial and error process to some extent to select the appropriate parameters. Therefore, since one has to select 5 parameters for the closed-loop eigenvalues and 6 parameters for the eigenvectors to design the controller, it becomes a very difficult task to select the optimum set of parameters which will give the best performance for the system. The WHECON 151 with yaw rate feedback is therefore a superior controller structure that can provide very fine pointing performance in both roll and yaw axes.

The feedback control loop 152 for attitude control system 150 must provide both control of the tilt angle of rotor 14 as well as minimize the addition of drift errors for purposes of measuring rates. A successful feedback control loop 152 depends on the careful control of the feedback loop phase characteristics. The basic difficulties are inherent in any tuned rotor gyroscope rebalance loop and those skilled in the art of tuned rotor gyroscope rebalance loop design will be familiar with the requirements.

The basic purpose of feedback loop 152 is to provide precession control of rotor 14. A simple proportional-plus-integral controller is applied on each of the two tilt axes to ensure asymptotic tracking of the tilt demand even when the system is dc-tuned. In addition, to account for the cross-axis control requirements for precession control, a −90 degree phase shift is introduced. The justification for this can be seen most easily by examining the complex variable formulation of the rotor dynamics. However, this simple and straightforward precession control system will excite the nutation dynamics of rotor 14. Thus, nutation damping must be included. One method for handling the nutation dynamics, as represented in the complex variable formulation of rotor 14 dynamics, is to employ low pass fillers that provides a full 180 degrees of phase shift at the nutation frequency. This ensures that as frequencies pass through the nutation resonance, the response locus with the added 180 degrees resonant phase lag and infinite gain will be restricted entirely to the right half plane. in a Nyquist analysis. It is necessary that the overall gain of this low pass phase lag loop be small enough so that the first unity gain cross over point occurs well before a 180 degree lag, that is, well below the nutation frequency. Consequently, this nutation damping approach assumes that the overall precession control bandwidth requirement is well below the nutation frequency.

Two other requirements are placed on the feedback control loop 152. Firstly, signals, which are inevitably generated by tilt sensor 24 at the spin speed of rotor 14, must be reduced to negligible amplitude using a notch filter. In addition, the gimbal motions, introduce an oscillation at twice the spin frequency in the rotation of the rotor 14, and this will be sensed by tilt sensors 24. These twice spin frequency signals must also be reduced to negligible amplitude using a notch filter. However, it is not possible to reduce the amplitude of these signals precisely to zero and any portion that is fed back to the rotor controller will interact with the actual twice spin frequency dynamics. The phasing of the twice spin speed feedback signal can introduce an effective drift rate in the sensed external rates applied to the system 10. Thus, careful phase adjustment of the twice spin frequency notch filters is required to limit this drift effect. Care is needed in ensuring that the phase shifts for these notch filters and the nutation control lag filters continue to sum to roughly 180 degrees, at the nutation frequency.

Figure 13:
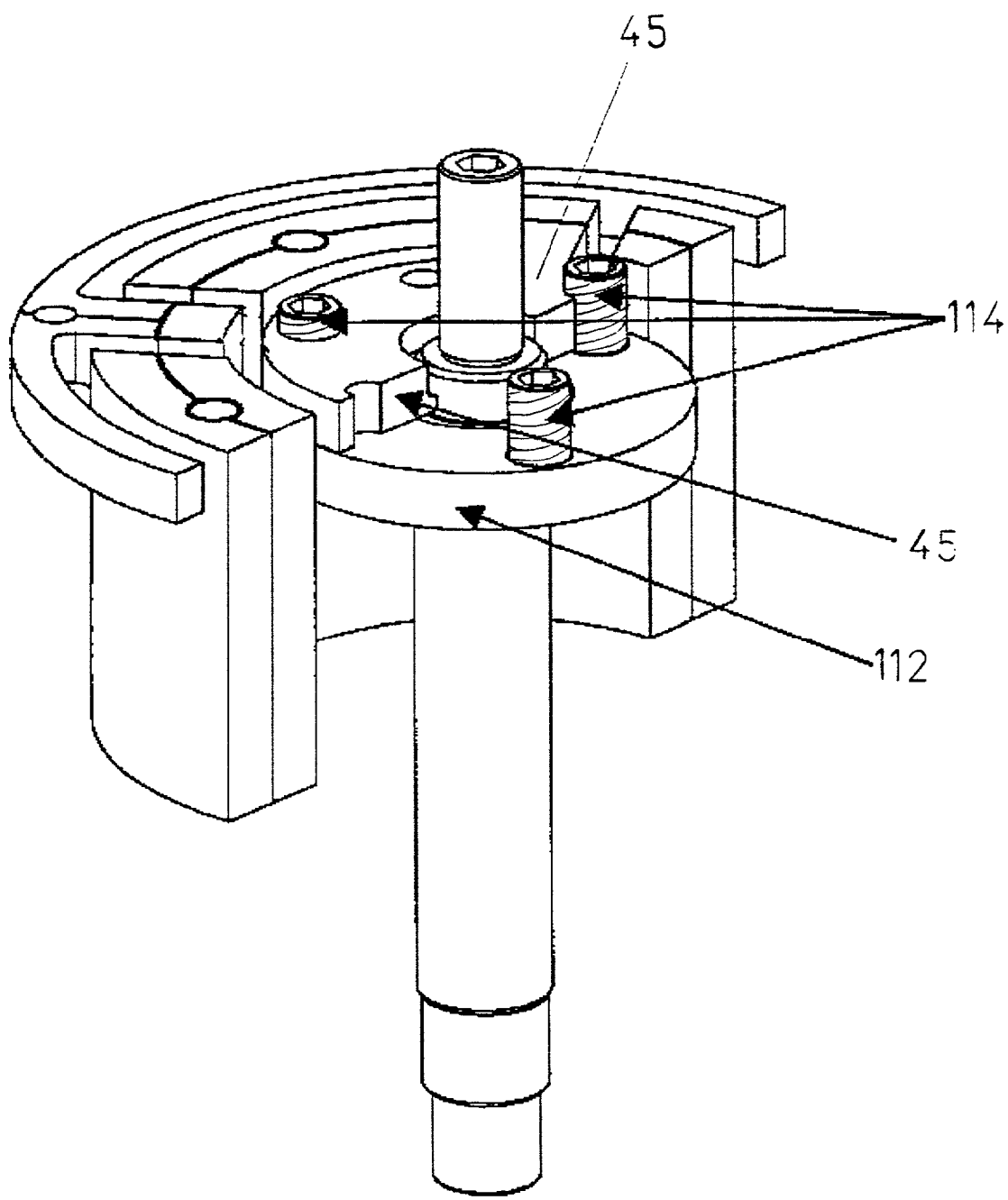
FIG. 13 is an isometric view, partially broken away illustrating an adjustable mounting of the gimbal on the drive shaft.
Figure 13:
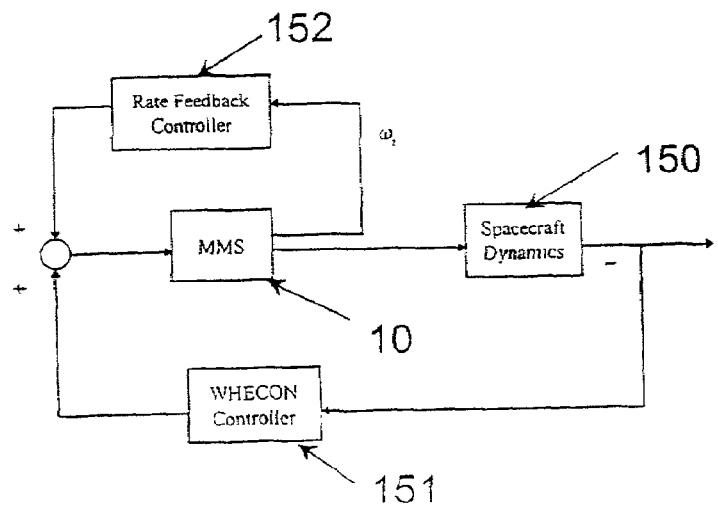

An adjustable mounting of the gimbal ring on the drive shaft is illustrated in FIG. 13. As shown, the drive shaft mounting flange 45 is fixed to a flange 112 on the drive shaft 22. Three adjustment screws 114 are screwed into bores through the drive shaft mounting flange. These screws engage the drive shaft flange 112. These screws are used to adjust the alignment angle of the drive shaft mounting flange 45 on the shaft flange 112. Because the flexures 20 are positioned below the drive shaft mounting flange 45, this angle is converted to a translational positioning of the pivot axes relative to the drive shaft. This arrangement allows the correction of small transverse misalignments that could cause large static imbalances due to the large rotor mass.

Figure 14:
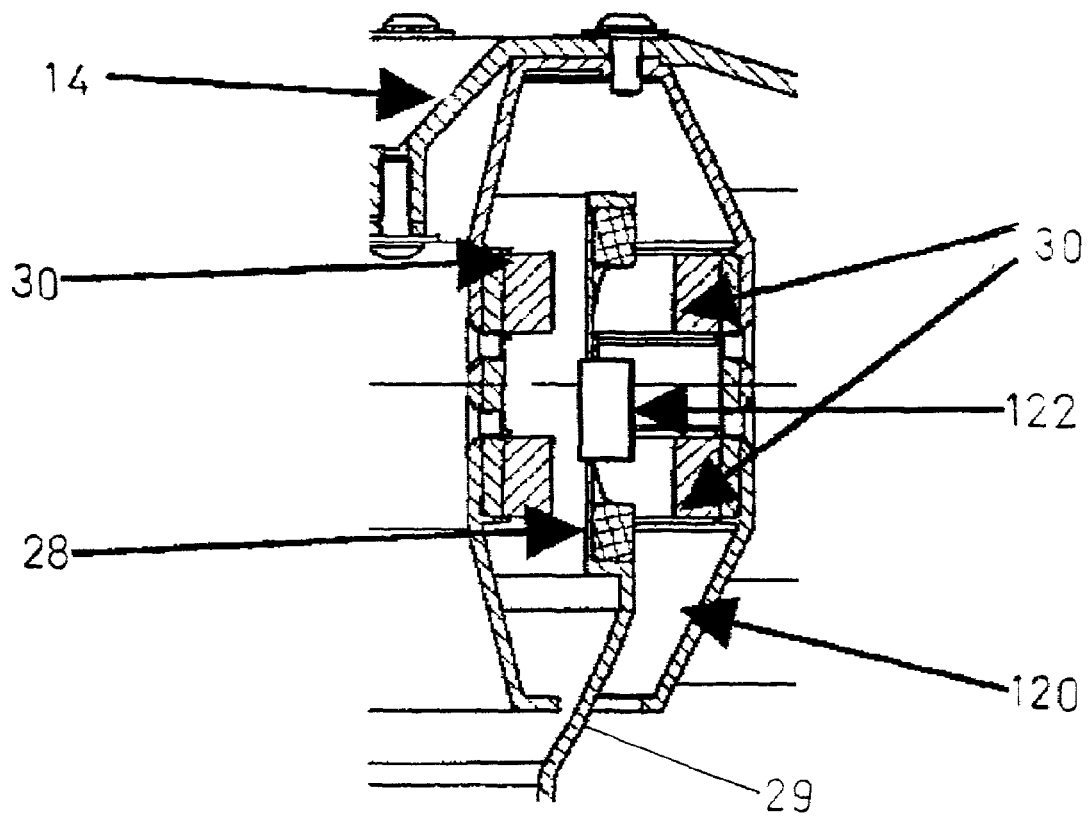
FIG. 14 is a cross section showing an alternative embodiment of the torque actuator.

FIG. 14 illustrates an embodiment of the invention designed to minimize disturbance torques introduced by external magnetic fields. In this embodiment the rotor 14 carries a ferromagnetic cage 120. The permanent magnets 30 are mounted inside the cage, on opposite sides. The torque coils 28 are mounted in the centre of the cage, between the permanent magnets. The ferromagnetic cage is used minimize the disturbance torques. Unlike with TRGs, this function cannot be provided by the housing of the device because the large rotor tilt angles relative to the housing during operation would induce significant magnetic hysteresis. This would compromise the rate sensing precision that can be obtained.

Because the magnetic properties of permanent magnets are temperature dependent, thermal sensors 122 are mounted on the torque coil stand 29 within the ferromagnetic cage. The sensors measure the temperature of the magnets. The sensor outputs are used as inputs to the calibration of the system. The sensors are miniature non-contact infra-red (IR) sensors, for example microbolometers, mounted on the support for the torque coils inside the magnetic cage. The cage has its inner surface coated with a high emissivity material, for example flat black paint, so that the signal from the sensor is not dependent on rotor tilt, but only on the temperature of the magnets. This avoids any need to thermally control the whole device.

Some of the advantages and innovations of system 10, and attitude control system 150 can be summarized as follows. Use of a spinning mechanical suspension system for rotor 14 allows for momentum steering about two axes. Such an approach, where mechanical gimbal ring 18 with flexure pivots 20 is used to support spinning rotor 14 has never before been used for a torque actuator. There are other approaches that use a magnetic suspension system that permit two axis momentum steering, and mechanical systems that tilt a spinning wheel. The use of gimbal 18 with flexure pivots 20 for suspending rotor 14 has a number of advantages. It can be designed to have infinite life with no wear-out modes and hence has much higher reliability than the magnetic suspension systems. It allows for a very simple, compact and cost effective implementation approach using torque coils 28 and permanent magnets 30 in rotor 14 to effect the momentum steering. And, it permits system 10 to be used as a precise rate sensor.

The gimbal design permits setting the tuned speed of system 10 to a particular value for each customer in a simple and cost-effective way that does require a design modification. This is required because a spacecraft momentum actuator must be able to perform over a relatively large speed range where the particular speed is a mission specific (i.e., customer specific) requirement. Hence each customer will have different tuned speed requirements. The tuned speed of gimbal 18 can be set by simply reducing the gimbal ring height from a baseline value which is designed for the lowest permissible tuned speed. This does not alter any other design feature in system 10, since ring 18 is free to flutter and the material removed is off the free ends of the ring 18 ensuring that the gimbal's interface to shaft 22 and rotor 14 remain unaltered. This process can easily be accommodated for each customer as trimming the gimbal ring height requires only a few extra machining operations prior to final welding of gimbal ring 18.

To operate over a relatively large tilt angle range, a tilt sensor is required that can 30 accommodate this range and yet maintain high precision through-out the range. Tilt sensor 24 which uses a relieved triangular pattern 32 on the ferromagnetic rotor surface and inductive pick-off 34 achieves this requirement and is very cost-effective to implement. Inductive pick-offs used in tuned rotor gyros and other concepts using optical techniques would not function over this required tilt range 610 deg.

The ability of system 10 to measure rates when the device is not operating at a tuned speed and when it is at non-zero angles was previously unachievable. This ability permits system 10 to be used as an actuator at the same lime as it is sensing rates. The conventional theory on tuned rotor gyros only addresses operating at zero angles while at the tuned speed. Therefore, the control approach and the rate sensing algorithms at untuned speeds provide key advantages.

Achieving a nearly constant torque scale factor over the entire tilt range 610 deg. Is an innovative feature permits significant improvement of the calibration of the system 10 over the full tilt range. By selecting the proper length of the axially magnetized permanent magnet rings 30 in rotor 14, the resultant rotor torque applied to rotor 14 from the current in torque coils 28 remains nearly constant with tilt angle. Equivalently, if radially magnetized rings are used, then the proper axial spacing of the rings is determinant.

Measuring rotor speed from tilt sensors 24 for the motor speed control gives improved precision of the rate sensing, since it reduces the nonlinear precession torques that are imparted to rotor 14 when it is at a non-zero tilt angle. Inductive tilt sensors 24 are also well suited to providing the signals required for rotor spin speed measurements. The traditional approach is to use the drive shaft speed using, for example, hall sensors that are integral to spin motor 74. However, such a high bandwidth control system could cause relatively large precession torques in system 10 when rotor 14 is at large tilt angles (e.g., a few degrees).

The integrated launch restraint system 61 ensures that flexures 20 cannot be overstressed under launch and handling loads without introducing other mechanisms that introduce new failure modes into system 10. Launch restraint system 61 is completely passive and does not engage unless a large load is applied to rotor 14.

The mirrored surface of the top of rotor 14 permits easy calibration. An auto-collimating telescope can be mounted to a one axis tilt table on which system 10 is also mounted to precisely align rotor 14 at specific angles relative to drive shaft 22. This set-up can be used to statically balance rotor 14 while it is not spinning, and it can also be used to calibrate tilt sensors 24 when rotor 14 is spinning.

High accuracy 3-axis pointing is possible using system 10 and only one additional 2-axis earth sensor(i.e. a yaw sensor is not required) is required to provide a highly accurate and lightweight attitude control system 150. The accuracy of this attitude control system 150 is driven by the earth sensor accuracy and the rate sensing accuracy of system 10, and is not dependent on an environmental disturbance torque requirement. Other approaches using a single bias momentum wheel have an accuracy that is dependent on the magnitudes of the wheel momentum and the environmental torques. Attitude control system 150, based on system 10, in a simple 3-axis attitude control system 150 consisting of only two primary components which significantly reduces the mass, power, and cost of attitude control system 150.

For earth pointing missions, the control law uses the measured roll angle from the earth sensor and the rate measurements from system 10 about the roll and yaw axes directly without the need for an attitude determination algorithm.

The form of the control law using the WHECON controller 151 with an additional yaw rate feedback loop 152 provides a form for the controller gain matrix that uses only four independent quantities. Since these four quantities have a practical significance, then it is possible to more easily select the set of parameters that give the best control system performance.

It will be apparent to those skilled in the art that the foregoing is by way of example only. Modifications, variations and alterations may be made to the described embodiments without departing from the scope of the invention which is defined solely in the claims.

We claim:

1. A momentum management system for attitude control of a spacecraft, the system having:
   a rotor drive having an output rotatable about a drive axis at a variable drive output speed;
   a gimbal assembly connected to the drive output;
   a momentum wheel rotor rotatable about a rotor axis for storing angular momentum, the rotor being mounted on the gimbal to be rotated about the drive axis by the rotor drive and for tilting movement about transverse axes orthogonal to the drive axis;
   a torque generation device for tilting the rotor about the transverse axes;
   a sensor for measuring the speed of the rotor rotation about the rotor axis and generating a sensor output representative of said speed; and
   drive control means responsive to the sensor output for varying the drive output speed so as to maintain the speed of the rotor rotation substantially constant.

2. A combined momentum management and rate sensor apparatus for spacecraft attitude control, comprising:
   a rotor drive having an output rotatable about a drive axis at a variable drive output speed;
   a gimbal assembly connected to the drive output;
   a momentum wheel rotor rotatable about a rotor axis for storing angular momentum, the rotor being mounted on the gimbal to be rotated about the drive axis by the rotor drive and for tilting rotation about transverse axes orthogonal to the drive axis;

a torque generation device for rotating the momentum wheel rotor about the transverse axes to vary the spacecraft attitude;

a sensor for measuring the rotor rotation about the transverse axes, and for generating a sensor output representative of the measured rotations;

a processor for receiving the sensor output and calculating from the sensor output spacecraft rotation rates about said transverse axes; and an attitude control for controlling operation of the torque generation device in accordance with the rotation rates calculated by the processor.

3. A combined momentum management and rate sensor apparatus according to claim 2 wherein the sensor comprises means for measuring the rotor speed of rotation about the rotor axis.

4. A combined momentum management and rate sensor apparatus according to claim 3 wherein the processor includes notch filters for filtering frequencies from the sensor output equal to the rotor speed of rotation and twice the rotor speed of rotation.

5. In a momentum management system according to claim 2 wherein:

the gimbal assembly comprises a gimbal ring coupling the drive output to the rotor; and the gimbal ring includes respective flexure joints connecting the gimbal ring to the drive and the rotor, the flexure joints being configured to permit the rotor to tilt about two flexure axes orthogonal to the drive axis, to incline the rotor axis through a range of angles from about 0 degrees to about 7 degrees with respect to the drive axis under the control of said torque generation device.

6. A momentum management system according to claim 5, wherein each flexure joint comprises a two resilient, non-parallel webs having respective ring ends connected to a body of the gimbal ring and respective mounting ends connected to one of the drive and the rotor.

7. A momentum management system according to claim 6, further comprising a launch restraint system to limit movement of the rotor along the drive axis, the launch restraint system including a stop mounted on the drive output and a cage mounted on the rotor and surrounding the stop.

8. A momentum management system according to claim 7, wherein the launch restraint system further includes deflection stops adjacent opposite sides of each web of each flexure for limiting deflection of the webs.

9. A momentum management system according to claim 2, the sensor comprising:

a part spherical surface on the momentum wheel rotor;
a pattern formed on the part spherical surface; and
a sensor mounted at a fixed position relative to the housing and positioned adjacent the part spherical surface for detecting the passage of the pattern past the sensor with rotation of the rotor.

10. A momentum management system according to claim 9, wherein the pattern has a leading edge and a trailing edge spaced apart circumferentially of the part spherical surface by a distance that varies with position along the rotor axis and the sensor detects the leading and trailing edges of the pattern whereby the sensor comprises a tilt sensor for measuring the amount of tilt of the rotor about the transverse axes.

11. A momentum management system according to claim 10 wherein the pattern is triangular.

12. A momentum management system according to claim 2, the torque generation device comprising:

an inner permanent magnet annul us mounted on the rotor, concentric with the rotor axis and with poles spaced apart by a pole spacing dimension along the rotor axis;

an outer permanent magnet annulus mounted on the rotor, concentric with the rotor axis and spaced radially from the inner permanent magnet annulus, with poles spaced apart by the pole spacing dimension along the rotor axis;

a torque coil annulus between the inner and outer permanent magnet annuli and concentric with the drive axis, the torque coil annulus having a core with a dimension axially of the drive axis that is greater than the pole spacing dimension.

13. A momentum management system according to claim 12 including a ferromagnetic cage mounted on the rotor and surrounding the inner and outer permanent magnet annuli and the torque coil annulus.

14. A momentum management system according to claim 13 including a thermal sensor within the ferromagnetic cage for measuring the temperature of the inner and outer permanent magnet annuli.

15. A momentum management system according to claim 14 wherein the cage has an inner surface coated with a high emissivity material.

16. A momentum management system according to claim 2, the torque generation device comprising:

inner and outer permanent magnet annuli mounted on the rotor, concentric with the rotor axis and spaced apart radially with respect to the rotor axis;

a torque coil annulus between the inner and outer permanent magnet annuli and concentric with the drive axis; and a ferromagnetic cage mounted on the rotor and surrounding the inner and outer permanent magnet annuli and the torque annulus.

17. A momentum management system according to claim 16 including a thermal sensor within the ferromagnetic cage for measuring the temperature of the inner and outer permanent magnet annuli.

* * * * *